(12) United States Patent
Sakai et al.

(10) Patent No.: US 6,717,303 B2
(45) Date of Patent: Apr. 6, 2004

(54) ELECTRIC ACTUATOR

(75) Inventors: Hiroshi Sakai, Kiryu (JP); Takao Ochiai, Ashikaga (JP); Yukiyoshi Iso, Gunma (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/365,224

(22) Filed: Feb. 12, 2003

(65) Prior Publication Data

US 2003/0173843 A1 Sep. 18, 2003

(30) Foreign Application Priority Data

Mar. 18, 2002 (JP) ........................................ 2002-074842

(51) Int. Cl.⁷ ................................................ H02K 7/10
(52) U.S. Cl. ...................... 310/75 R; 310/71; 310/68 R; 310/68 B; 310/80; 310/83
(58) Field of Search ............................ 310/75 R, 68 R, 310/68 B, 83, 80, 71

(56) References Cited

U.S. PATENT DOCUMENTS

| | | | | |
|---|---|---|---|---|
| 4,652,781 A | * | 3/1987 | Andrei-Alexandru | ........ 310/83 |
| 6,107,712 A | * | 8/2000 | Yamamura | ................. 310/68 B |
| 6,201,326 B1 | * | 3/2001 | Klappenbach et al. | ..... 310/75 R |
| 6,504,276 B2 | * | 1/2003 | Yamamura | ................. 310/75 R |

FOREIGN PATENT DOCUMENTS

| JP | 09-216518 | | 8/1997 | |
|---|---|---|---|---|
| JP | 216518 | * | 9/1997 | ............. B60J/7/057 |
| JP | 11-334379 | * | 11/1999 | ............. B60J/7/057 |
| JP | 11-334379 | | 12/1999 | |
| JP | 2001-219742 | * | 8/2001 | ............. B60J/7/057 |

* cited by examiner

*Primary Examiner*—Burton S. Mullins
*Assistant Examiner*—Iraj A. Mohandesi
(74) *Attorney, Agent, or Firm*—McCormick, Paulding & Huber LLP

(57) ABSTRACT

Improving layout characteristics of a detecting switch with respect to a control board to miniaturize an electric actuator. Switch-side connecting terminals are provided in a limit switch constituting a panel-position detecting mechanism, which is fixed to an outer face of a motor cover. Meanwhile, board-side connecting terminals having connecting portions to be terminal-connected to the switch-side connecting terminals are fixed to the control board, and the control board is disposed inside the motor cover and is fixed in a board case. By moving the limit switch toward the connecting portions, the switch-side connecting terminals and the connecting portions are connected, whereby the limit switch and the control board are connected.

20 Claims, 8 Drawing Sheets

ELECTRIC ACTUATOR

This application is entitled to the benefit of and incorporates by reference essential subject matter disclosed in Japanese Patent Application No. 2002-074842 filed on Mar. 18, 2002.

BACKGROUND OF THE INVENTION

The present invention relates to an electric actuator for outputting rotation of an electric motor through a speed reduction mechanism, and particularly to a technique effectively applied to an electric actuator, which is provided with position detecting means for detecting a rotational position of an output shaft and a control board for controlling the electric motor.

An electric actuator is a device such as an electric motor for converting an electrically generated driving force into work such as a mechanical linear or rotational motion or the like. Because the electric actuator has higher energy efficiency and is excellent in controllability as compared with an actuator in which air pressure or hydraulic pressure is used, it is widely used for automobile parts and the like.

As such an electric actuator, for example, there is a known sunroof motor used as a driving source of a sunroof system provided in a vehicle such as an automobile or the like, as disclosed in Japanese Patent Laid-open No. 2001-219742. In this case, the sunroof system has a roof panel, which is guided by a guide rail fixed to a roof of the vehicle and is provided to be openable and closeable. A driving cable having a gear is linked to the roof panel. Meanwhile, the sunroof motor has an electric motor and a worm gear mechanism, whereby a speed of rotation of the electric motor is reduced by the worm gear mechanism and transferred to an output shaft. Also, a driving gear is fixed to the output shaft of the sunroof motor and the driving cable is engaged with the driving gear. By an operation of the sunroof motor, the driving gear actuates the driving cable in an axial direction, so that the roof panel is opened and closed while being pushed and pulled by the driving cable.

As such a sunroof motor, for example, there is one provided with a panel-position detecting mechanism for detecting a position of a roof panel and a controller for controlling an electric motor based on a signal from the panel-position detecting mechanism, in order to stop the actuation of the roof panel when the roof panel is in a fully-open state or a fully-closed state, as disclosed in Japanese Patent Laid-open No. 9-216518 and No. 11-334379. In this case, the panel-position detecting mechanism includes a cam plate having cam teeth on its outer peripheral face and a limit switch slidably contacting with the outer peripheral face of the cam plate, whereby the cam plate rotates in synchronization with an output shaft. When the roof panel comes to a fully-open or fully-closed state, the cam teeth turn the limit switch on from off and the limit switch outputs a position detecting signal. Meanwhile, the controller has a control board, which is provided with a control circuit formed of a plurality of electric circuit elements, and the limit switch is connected to the control board through a lead wire. The control board controls the electric motor based on the position detecting signal from the limit switch.

In such a sunroof motor, the panel-position detecting mechanism and the controller are housed in an actuator case together with the worm gear mechanism, thereby being formed like a unit as a whole.

SUMMARY OF THE INVENTION

Because such a sunroof motor is mounted onto a roof of a vehicle, it is desired to miniaturize the sunroof motor. However, in the conventional sunroof motor, since both the limit switch and the control board are fixed in the actuator case, a fixed place of the limit switch to the control board is limited. Therefore, it is difficult to fix the limit switch in the vicinity of the control board to miniaturize the sunroof motor.

An object of the present invention is to improve layout characteristics of a detecting switch relative to a control board to miniaturize an electric actuator.

An electric actuator of the present invention, which has an electric motor, an actuator case fixed to said electric motor, and a speed reduction mechanism housed in said actuator case and reducing a speed of rotation of said electric motor to transmit the rotation to an output shaft, comprises: a detecting switch fixed outside said actuator case and actuated by a cam member operated in synchronization with said output shaft to output a detecting signal in accordance with a rotational position of said output shaft; control means fixed inside said actuator case and having a control board for controlling said electric motor based on said detecting signal from said detecting switch; and a connecting member for electrically connecting said detecting switch and said control board through a connecting through hole provided in said actuator case.

According to an electric actuator of the present invention, said connecting member is a board-side connecting terminal including: a leg portion fixed to said control board; and a connecting portion projecting outside from said connecting through hole to be connected to a switch-side connecting terminal provided to said detecting switch.

According to an electric actuator of the present invention, said leg portion is formed by bending in a crank shape.

According to an electric actuator of the present invention, said detecting switch is screwed to said actuator case from a direction perpendicular to a connection direction of said switch-side connecting terminal and said connecting portion.

According to an electric actuator of the present invention, a support wall portion facing said board-side connecting terminal is formed integrally with said actuator case on a back side of said connecting portion relative to said connecting direction.

According to an electric actuator of the present invention, said cam member is disposed coaxially with said output shaft, and said detecting switch is in slidable contact with an outer peripheral face of said cam member.

According to an electric actuator of the present invention, said switch-side connecting terminal is connected to said connecting portion by moving said detecting switch away from said output shaft, and said detecting switch is screwed from a direction parallel to an axial direction of said output shaft.

According to an electric actuator of the present invention, said cam member and said detecting switch are covered with a cover engaged with said actuator case.

According to an electric actuator of the present invention, said output shaft is connected to an opening/closing member openably and closably mounted to a roof of a vehicle, and said opening/closing member is opened and closed by rotation of said output shaft.

According to the present invention, the detecting switch is fixed outside the actuator case, and the control means is fixed inside the actuator case, and the detecting switch and the control means are electrically connected through the connecting through hole by the connecting member.

Therefore, the layout characteristics of the detecting switch relative to the control board are improved, and the detecting switch can be fixing in the vicinity of the control means, and the electric actuator can be miniaturized.

DESCRIPTION OF THE PREFERRED EMBODIMENTS

An embodiment of the present invention will be specifically described below based on the drawings.

Figure 1:
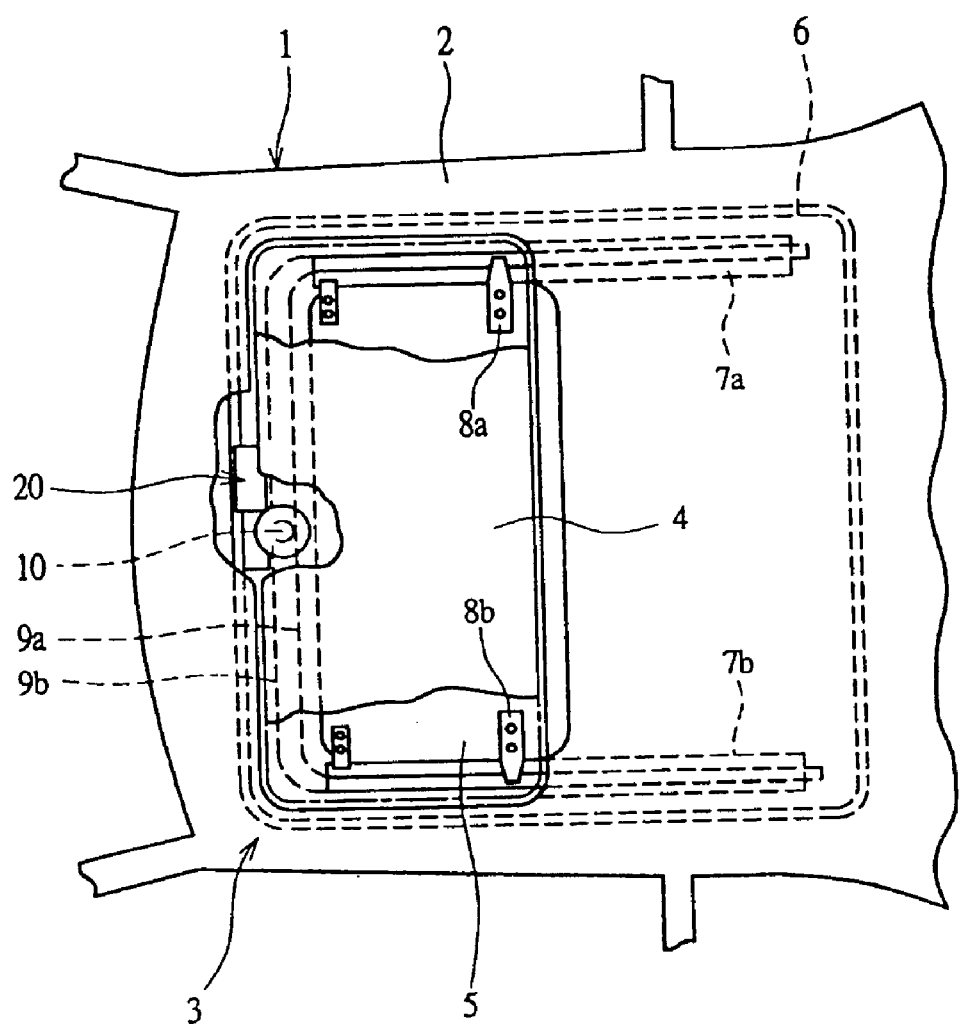
FIG. 1 is a schematic plan view showing a vehicle, mounted on a sunroof system having a sunroof motor that is an embodiment of the present invention.
Figure 2A:
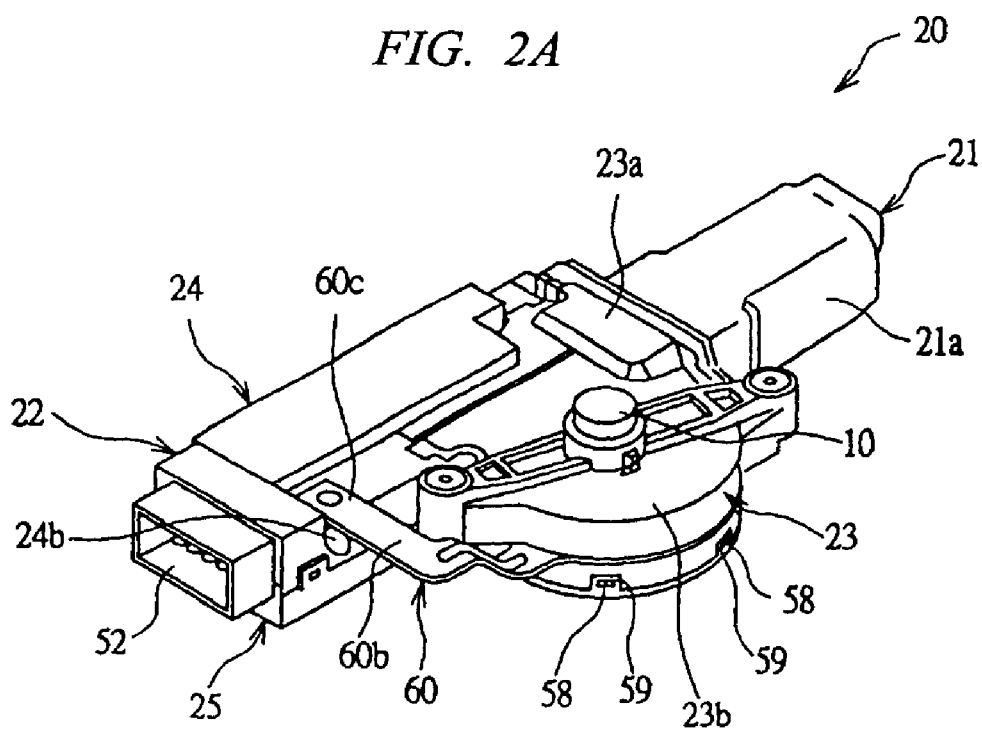
FIG. 2A is a perspective view illustrating the details of the sunroof motor shown in FIG. 1.
Figure 2B:
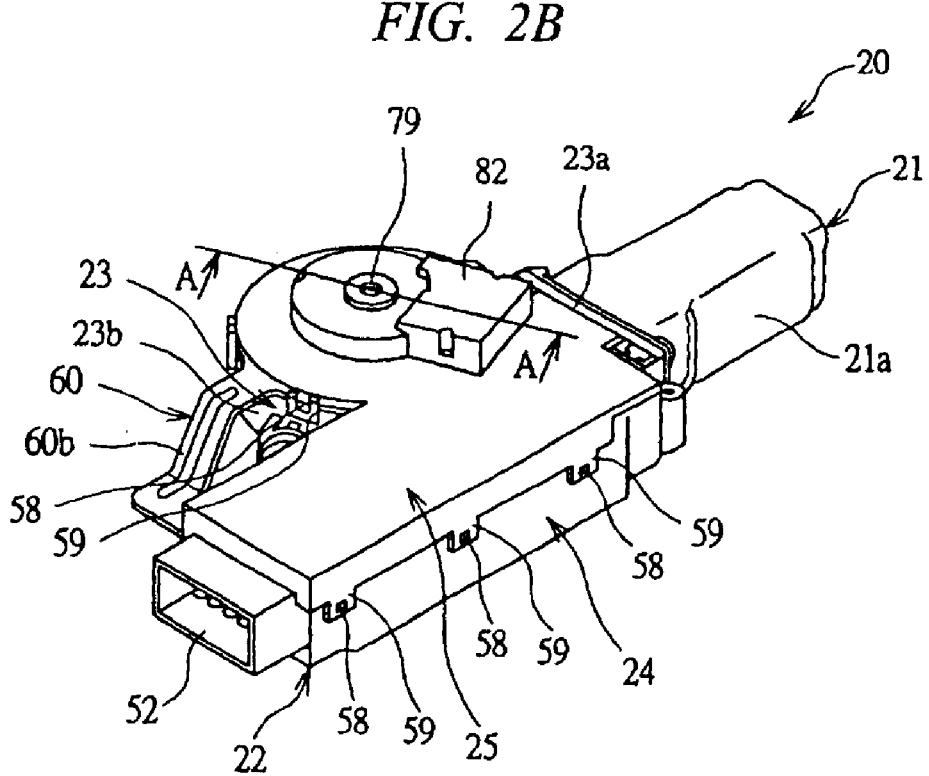
FIG. 2B is a perspective view illustrating the details of the sunroof motor shown in FIG. 1.
Figure 3:
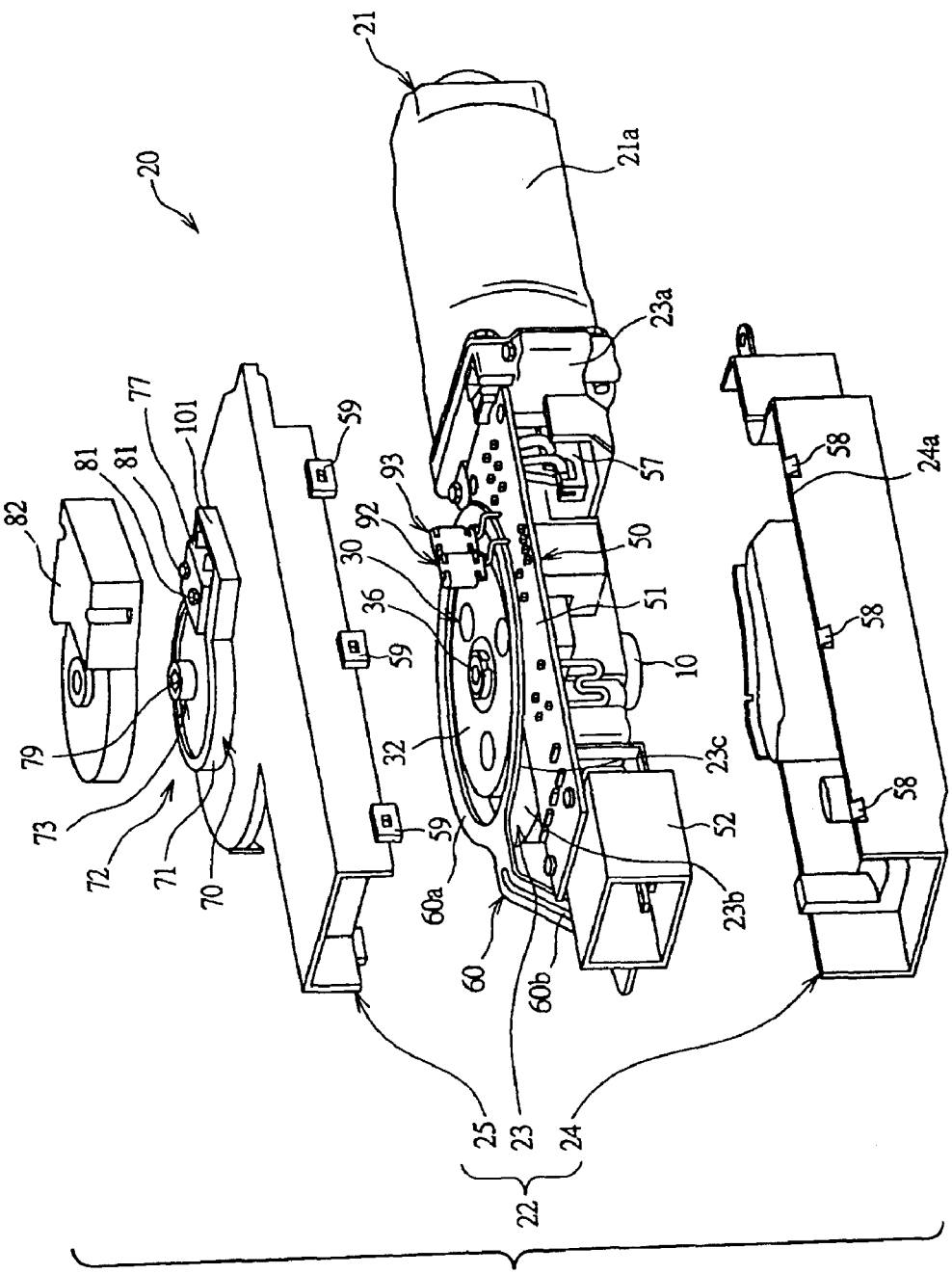
FIG. 3 is an exploded perspective view illustrating a structure of the sunroof motor shown in FIG. 1.
Figure 4:
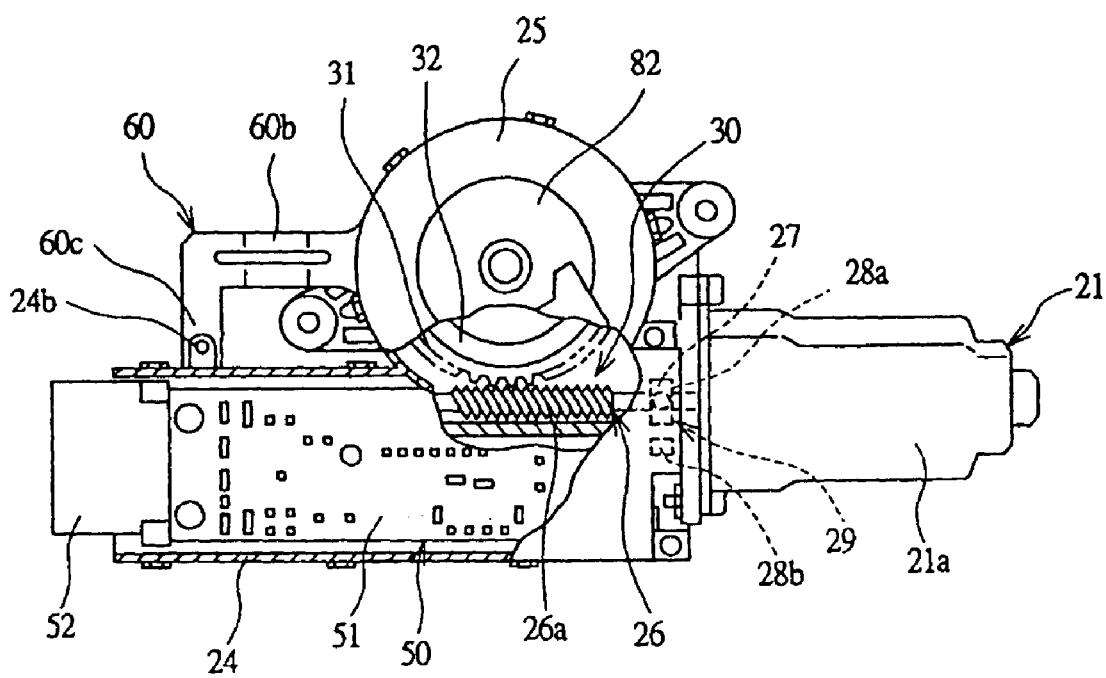
FIG. 4 is a partially cutaway sectional view illustrating the structure of the sunroof motor shown in FIG. 1.
Figure 5:
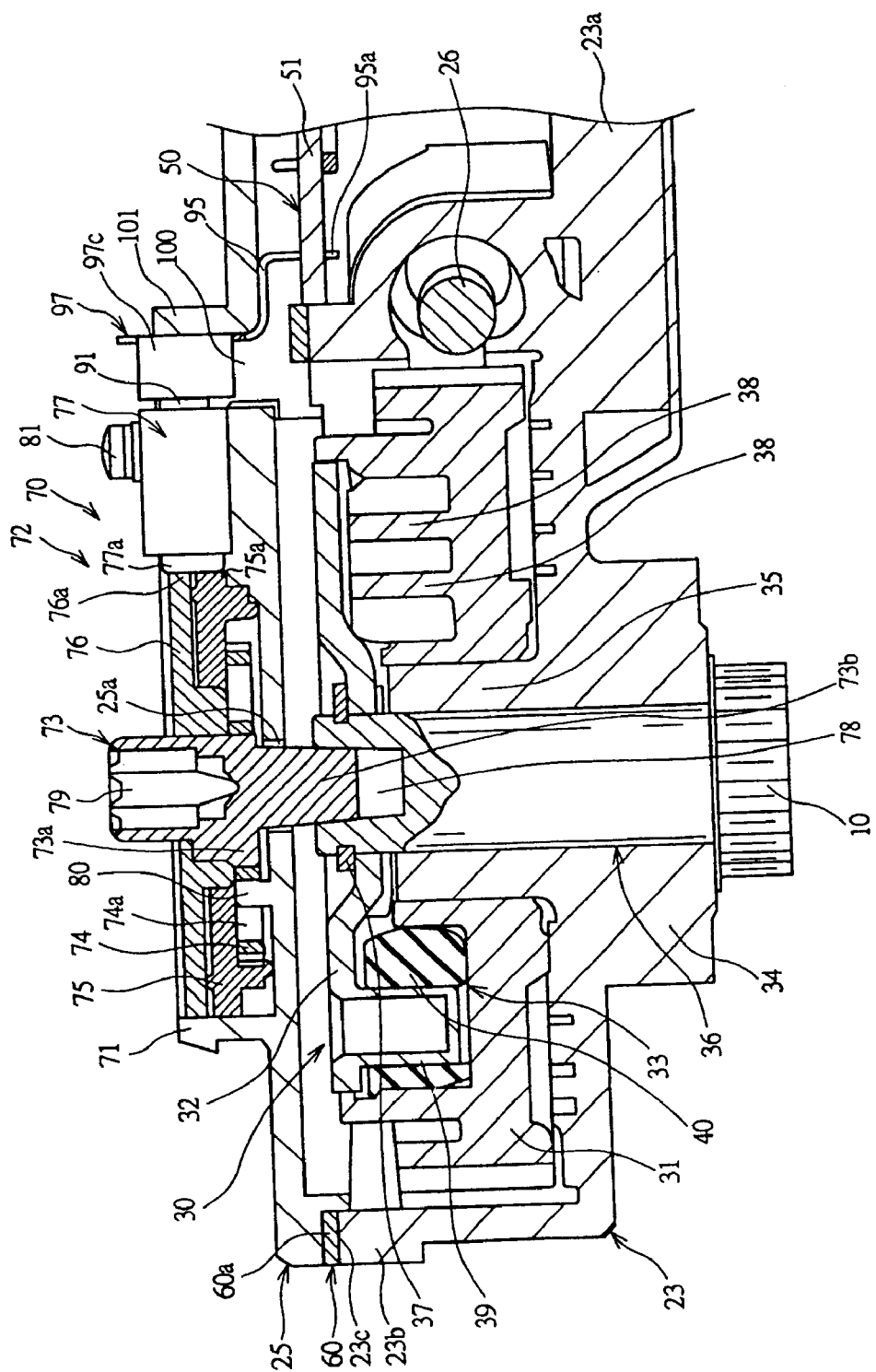
FIG. 5 is a cross-sectional view taken along the line A—A shown in FIG. 2B.
Figure 6:
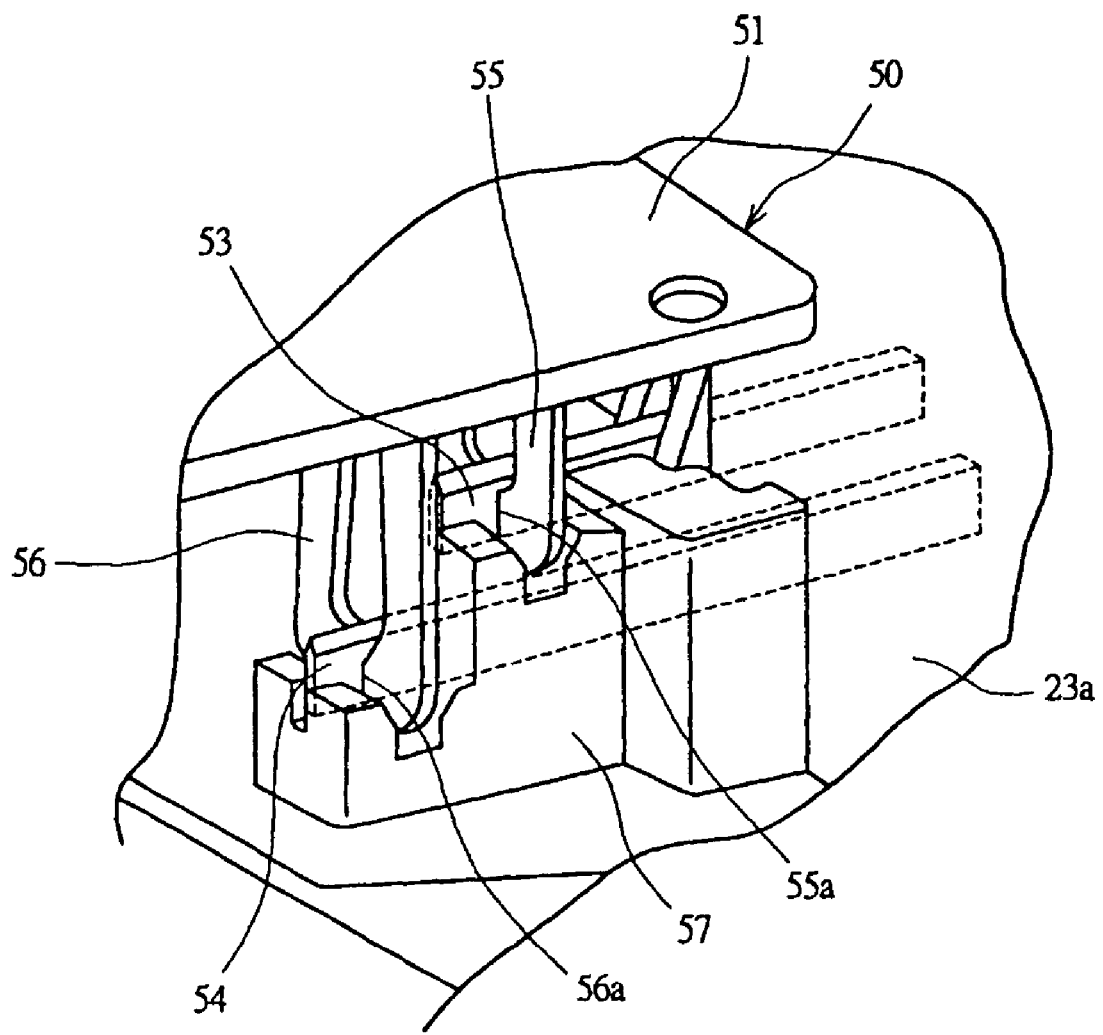
FIG. 6 is a perspective view showing the details of a connecting portion between an electric motor and a control board.
Figure 7:
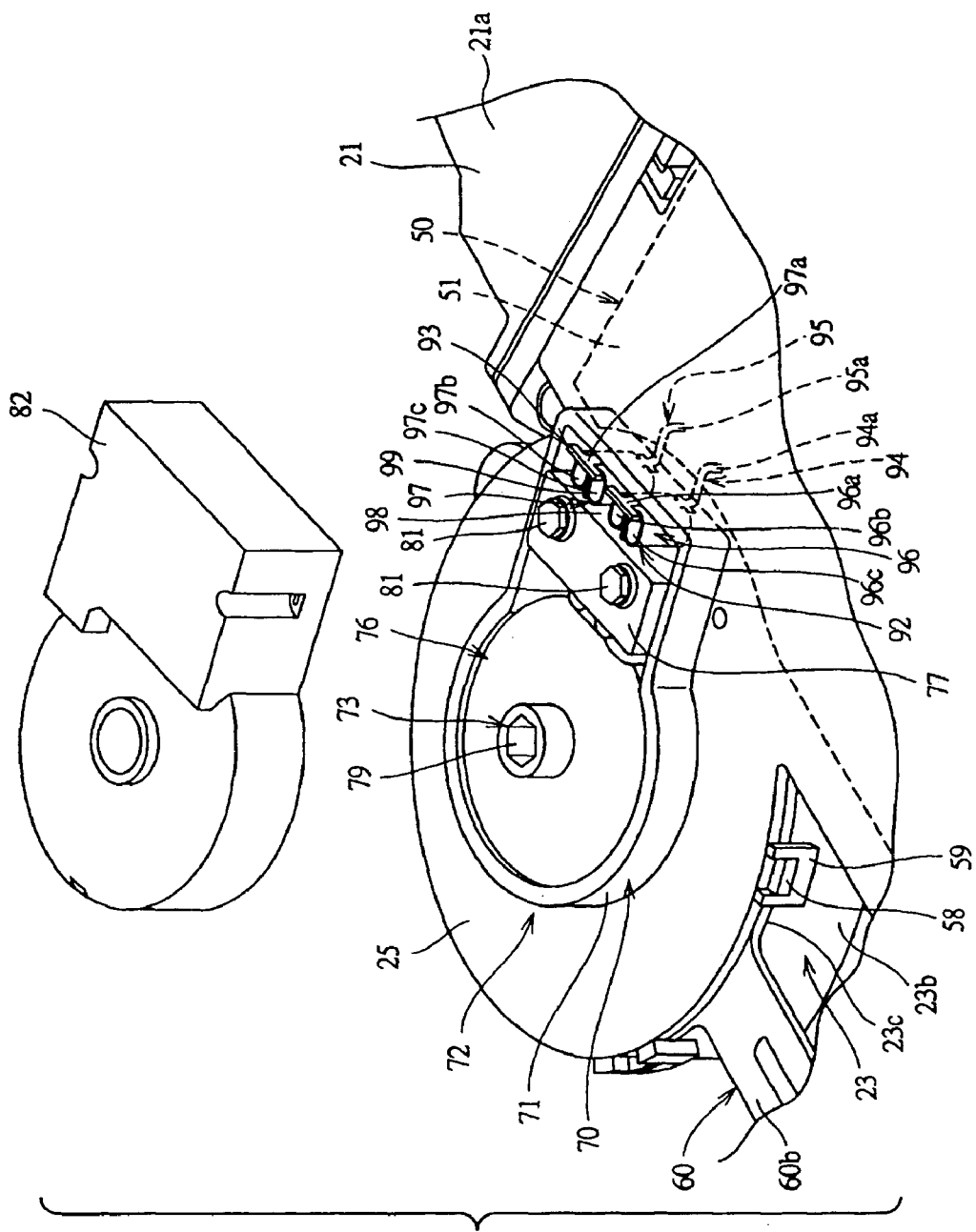
FIG. 7 is a perspective view showing a state of the connection between a limit switch and the board.
Figure 8A:
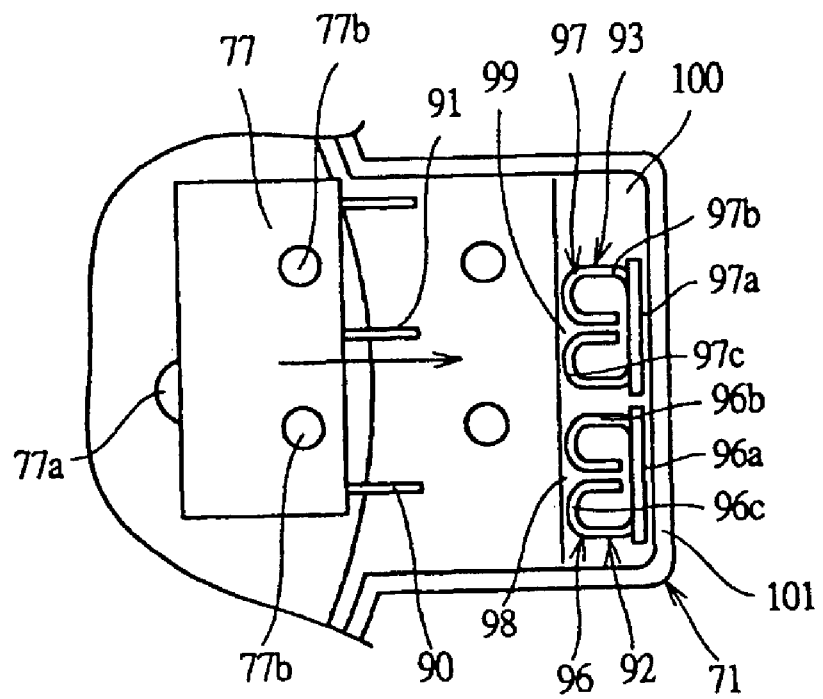
FIG. 8A is a plan view illustrating a method of mounting the limit switch shown in FIG. 7.
Figure 8B:
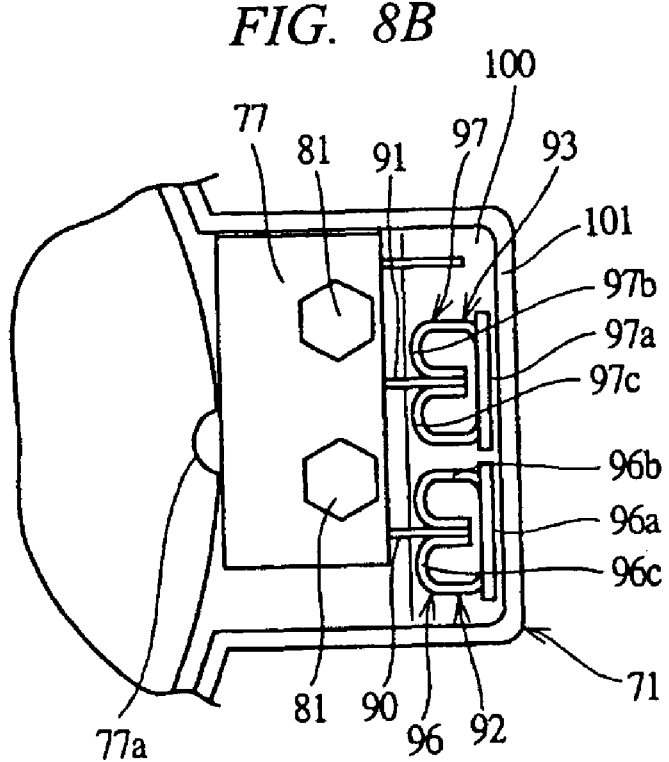
FIG. 8B is a plan view illustrating a method of mounting the limit switch shown in FIG. 7.

FIG. 1 is a schematic plan view showing a vehicle, mounted on a sunroof system having a sunroof motor that is an embodiment of the invention, and FIGS. 2A and 2B are each a perspective view illustrating the details of the sunroof motor shown in FIG. 1. Also, FIG. 3 is an exploded perspective view illustrating a structure of the sunroof motor shown in FIG. 1, and FIG. 4 is a partially cutaway sectional view illustrating the structure of the sunroof motor shown in FIG. 1. Further, FIG. 5 is a cross-sectional view taken along the line A—A shown in FIG. 2B, and FIG. 6 is a perspective view showing the details of a connecting portion between an electric motor and a control board. Further, FIG. 7 is a perspective view showing a state of a connection between a limit switch and the board, and FIGS. 8A and 8B are plan views illustrating a method of mounting the limit switch shown in FIG. 7.

As shown in FIG. 1, a sunroof system 3 is provided in a roof 2 of a vehicle 1. The sunroof system 3 has a roof panel 4 as an opening/closing member openably and closably mounted on the roof 2. A mounting frame 6, located at a periphery of an opening portion 5 formed in the roof 2, is fixed to the roof 2. Also, two guide rails 7a and 7b, each extending in a front-and-rear direction of the vehicle, are fixed to the mounting frame 6. Shoes 8a and 8b are mounted on the guide rails 7a and 7b to be movable along the guide rails 7a and 7b, respectively, and the roof panel 4 is fixed to the shoes 8a and 8b. The roof panel 4 is guided by the guide rails 7a and 7b together with the shoes 8a and 8b, thereby being opened and closed in the front-and-rear direction of the vehicle.

To the shoes 8a and 8b, one ends of driving cables 9a and 9b having gears are connected, respectively. The driving cables 9a and 9b are respectively arranged in a front side of the vehicle, and are engaged with a driving gear 10, which is rotatably mounted on a vehicle-front side of the mounting frame 6. Also, the driving cables 9a and 9b are directed in directions opposite to each other by rotation of the driving gear 10 and are actuated in each axial direction, whereby the roof panel 4 is opened or closed depending on the pushing or pulling of the driving cables 91a and 91b. Therefore, a rotational direction of the driving gear 10 determines the respective actuating directions of the driving cables 9a and 9b to thereby determine a direction of movement of the roof panel 4.

To drive the driving gear 10 for rotation, a sunroof motor 20 is provided in the sunroof system 3.

As shown in FIGS. 2A, 2B and 3, the sunroof motor 20 has a structure in which an actuator case 22 is fixed to an electric motor 21. The actuator case 22 has a gear case 23, a board case 24, and a motor cover 25.

The gear case 23 has a mounting portion 23a for a yoke 21a of the electric motor 21 and a gear housing portion 23b formed integrally with the mounting portion 23a, and is fixed to an end face of the yoke 21a of the electric motor 21 at the mounting portion 23a. As shown in FIG. 4, a worm gear 26a is formed on an armature shaft 26 serving as a rotation-output shaft of the electric motor 21. The worm gear 26a passes through the mounting portion 23a and projects toward the gear housing portion 23b. The electric motor 21 is provided with a revolution speed sensor 29, which includes a magnet 27 fixed to the armature shaft 26 and two Hall ICs 28a and 28b each having a phase angle of 90° and provided onto a control board 51 which will be described later. When the armature shaft 26 rotates, the revolution speed sensor 29 outputs a pulse signal in accordance with rotation of the armature shaft 26 from each of the Hall ICs 28a and 28b.

The gear housing portion 23b is formed in a cylindrical shape with a bottom, which has an opening portion 23c in its face. Inside the gear housing portion 23b, a worm gear mechanism 30 as a speed reduction mechanism including a worm gear 26a is housed.

The worm gear mechanism 30 has, in addition to the above-described worm gear 26a, a worm wheel 31, a follower plate 32, and a damper mechanism 33. The worm wheel 31 is disposed in a side of a bottom wall 34 of the gear housing portion 23b, and is rotatably supported on an outer peripheral face of a boss portion 35, which is formed like a cylinder to project from the bottom wall 34. The worm wheel 31 is engaged with the worm gear 26a, thereby reducing a speed of rotation of the armature shaft 26 by a large speed reduction ratio and rotating.

An output shaft 36 of the sunroof motor 20 is rotatably supported on the boss portion 35. The follower plate 32 is fitted to an end of the output shaft 36 for integral rotation, and is fixed by a C-ring 37 so as not to slip in an axial direction of the output shaft 36. As a result, the follower plate 32 is coaxially with the worm wheel 31 on a side face of the worm wheel 31 and rotates with the output shaft 36.

The damper mechanism 33 is provided between the worm wheel 31 and the follower plate 32, and rotation of the worm wheel 31 is transferred to the follower plate 32 through the damper mechanism 33. In other words, the damper mechanism 33 has: three engaging projections 38 formed at intervals of 120° on the side face of the worm wheel 31 facing the follower plate 32; three engaging projections 39 formed at intervals of 120° on a side face of the follower plate 32 facing the worm wheel 31; and a damper rubber 40 having six holes formed at intervals of 60° so as to be fitted to the engaging projections 38 and 39. When the worm wheel 31 rotates, its rotating force is transferred to the engaging projections 39 through the damper rubber 40 from the engaging projections 38 to rotate the follower plate 32.

With such a structure, rotation of the electric motor 21 is transferred to the output shaft 36 through the worm gear mechanism 30 to drive the output shaft 36 for rotation. The driving gear 10 is fixed to a tip of the output shaft 36, which projects from the bottom wall 34 of the gear housing portion 23b toward the outside, and rotates with the output shaft 36.

The board case 24 is formed in a shape of a bathtub having an opening portion 24a on one face, and is disposed to be adjacent to the gear case 23 such that an opening direction of the opening portion 24a is aligned with an opening direction of an opening portion 23c of the gear case 23. The board case 24 is fitted to the gear case 23 and is screwed to the mounting portion 23a of the gear case 23.

A controller 50 as control means is housed in the board case 24, and the controller 50 has a control board 51 provided with a control circuit formed of a plurality of electric circuit elements. At positions on the control board 51, which faces the magnet 27 fixed to the armature shaft 26, two Hall ICs 28a and 28b each having a phase angle of 90° are provided through an outer wall of the mounting portion 23a. The control board 51 is screwed to the board case 24, and a connecting coupler 52 fixed to a tip of the control board 51 projects from the board case 24.

To the connecting coupler 52, an input coupler (not shown), which is connected to a battery (not shown) and to a sunroof opening/closing switch and the like provided in a vehicle room (not shown), is connected. Thereby, power from the battery is supplied to the controller 50, and ON and OFF signals from the sunroof opening/closing switch are input. Further, a revolution speed sensor 29 is connected to the control board 51, and the controller 50 can detect the revolution speed of and the rotational direction of the armature shaft 26 by a pulse signal from the revolution speed sensor 29.

Also, the control board 51 is provided with two power supply terminals 55 and 56, which is connected to brush feeding terminals 53 and 54 of the electric motor 21. The brush feeding terminals 53 and 54 of the electric motor 21 are each formed in a shape of a long plate, each side of which is different in length, and are provided in parallel with the armature shaft 26 to project from the end face of the electric motor 21 toward the mounting portion 23a. The brush feeding terminals 53 and 54 pass through a through hole (not shown) provided in the mounting portion 23a and, are supported at a power-supply-terminal supporting block 57 formed on the mounting portion 23a. Meanwhile, the power supply terminals 55 and 56 are formed in C shapes and have notch portions 55a and 56a, respectively, and are fixed to the control board 51 so that the notch portions 55a and 56a each face a side of the power-supply-terminal supporting block 57. With the brush feeding terminals 53 and 54 being sandwiched in the notch portions 55a and 56a, the power supply terminals 55 and 56 are connected to the brush feeding terminals 53 and 54, respectively. To these power supply terminals 55 and 56, a current controlled by the control board 51 is supplied. Namely, electric power is supplied to the electric motor 21 through the power supply terminals 55 and 56. With such a structure, the controller 50 can control the electric power supplied through the connecting coupler 52 to supply the supplied electric power to the electric motor 21, thereby controlling the actuation of the electric motor 21.

The opening portions 23c and 24a of the gear case 23 and the board case 24 are closed by a motor cover 25, respectively. The motor cover 25 has such a shape as to simultaneously close the opening portions 23c and 24a of the gear case 23 and the board case 24, and is fixed by engaging a hook 59 with a projection 58 provided to each of the cases 23 and 24. As a result, the gear case 23 and the board case 24 are closed with the motor cover 25, and simultaneously fixed to each other through the motor cover 25. Therefore, excessive vibration of the board case 24 due to vibration of the gear case 23 is suppressed, which results in improvements in reliability of the control board 51 and the like fixed inside the board case 24.

Further, a stay 60 is provided between the gear case 23 and the board case 24. The stay 60 has a gear-case-side fixing portion 60a, which is formed in an annular shape that is the same as a shape of an outer edge of the opening portion 23c of the gear housing portion 23b, and a support strip 60b formed integrally with the gear-case-side fixing portion 60a. Also, a tip of the support strip 60b serves as a board-case-side fixing portion 60c. The gear-case-side fixing portion 60a is sandwiched between the opening portion 23c of the gear housing portion 23b and the motor cover 25, and the board-case-side fixing portion 60c is screwed to a stay mounting portion 24b provided to the board case 24. Thereby, the stay 60 is fixed between the gear case 23 and the board case 24.

For this result, the gear case 23 and the motor cover 25 are connected and fixed to each other through the stay 60, whereby the gear case 23 and the board case 24 are fixed to each other more firmly. Therefore, vibration generated by the worm gear mechanism 30 prevents the board case 24 from being excessively vibrated relative to gear case 23, so that reliability of the sunroof motor 20 can be improved. Also, since the gear-case-side fixing portion 60a is formed in the same shape as that of the outer edge of the opening portion 23c of the gear housing portion 23b and is disposed between the gear housing portion 23b and the motor cover 25, it becomes easy to mount the stay 60.

A position-detecting-mechanism mounting portion 70 is provided in an outer face side of a portion of the motor cover 25, the portion at which the gear housing portion 23b is closed. The position-detecting-mechanism mounting portion 70 is defined by a wall portion 71, and the position-detecting-mechanism mounting portion 70 is provided with a panel-position detecting mechanism 72 connected to an end portion of the output shaft 36, the end portion being opposite to the end portion mounted on the driving gear 10.

The panel-position detecting mechanism 72 has a main shaft 73, an external gear 74, an internal gear 75, a cam plate 76, and a limit switch 77, wherein the main shaft 73 is connected to the output shaft 36. A hexagonal fitting hole 78 is formed in a tip, which is opposite to the tip of the output shaft 36 on which the driving gear 10 is mounted. A hexagonal prism portion 73b formed at an end portion of the main shaft 73 is fitted and fixed into the fitting hole 78, and projects outside the motor cover 25 through a through hole 25a provided in the motor cover 25. By so doing, the main shaft 73 is coaxially connected to the output shaft 36, thereby rotating with the output shaft 36. A hexagonal tool hole 79, into which a tool for manual operation is inserted, is formed in an end portion of the main shaft 73, and the output shaft 36 can be rotated by using the tool for manual operation (not shown) to open and close the roof panel 4 in an emergency.

The main shaft 73 is integrally formed with a disc-shaped eccentric portion 73a eccentric with respect to a center axis of the main shaft 73, and the external gear 74 is mounted on the eccentric portion 73a. The external gear 74 has an engaging hole 74a, and a pin 80 projecting from the motor cover 25 is engaged with the engaging hole 74a so as to have desirable play. Namely, rotation of the external gear 74 is restricted by the pin 80, whereby the external gear 74 does an excursion by an eccentricity amount of the eccentric portion 73a due to rotation of the main shaft 73 and swings in accordance with the above-mentioned play.

Outside the external gear 74, the internal gear 75 having n teeth (e.g., one tooth) more than the external gear 74 is rotatably disposed about the main shaft 73. The disk-shaped cam plate 76 used as a cam member is fixed to the internal gear 75, whereby the camp plate rotates with the internal gear 75. Also, a cam tooth 75a is formed on the outer peripheral face of the internal gear 75.

Further, a cam tooth 76a is formed also on an outer peripheral face of the cam plate 76, and the limit switch 77 as a detecting switch is disposed such that its switch portion 77a is in slidable contact with the respective cam teeth 75a and 76a.

The limit switch 77 as a detecting switch is disposed outside the motor cover 25, i.e., on the outer face thereof, so that the switch portion 77a is in slidable contact with the respective cam teeth 75a and 76a. The limit switch 77 is fixed to the motor cover 25 by a screw member 81, which has a screwing direction parallel to the axial direction of the output shaft 36. A position-detecting-portion cover 82 is mounted on an upper portion of the position-detecting-mechanism mounting portion 70 to be engaged with the wall portion 71, so that the panel-position detecting mechanism 72 is covered with the position-detecting-portion cover 82.

In the panel-position-detecting mechanism 72 having such a structure, the external gear 74 swings as the main shaft 73 rotates with the output shaft 36. The external teeth of the external gear 74 are engaged with internal teeth of the internal gear 75, so that the internal gear 75 rotates by n teeth in connection with one swing of the external gear 74. In the present embodiment, the internal gear 75 is set to have one turn when the main shaft 73 has 16 turns. The cam plate 76 rotates with the internal gear 75, and the respective cam teeth 75a and 76a abut on the switch portion 77a, whereby the limit switch 77 is actuated. In other words, the cam plate 76 rotates in synchronization with the output shaft 36 and the limit switch 77 outputs a position detecting signal in accordance with rotational positions of the cam plate 76 and the internal gear 75, i.e., a rotational position of the output shaft 36. Note that, in this sunroof motor 20, the limit switch 77 and the respective cam teeth 75a and 76a are set such that the limit switch 77 is turned off when the roof panel 4 is fully closed and fully opened. Therefore, by the panel-position detecting mechanism 72, it is possible to detect whether the roof panel 4 has reached a fully-open position or a fully-closed position. Note that, at this time, since the position detecting signal from the limit switch 77 is made to synchronize the revolution speed of and the rotating direction of the armature shaft 26 detected by the revolution speed sensor 29, the position of the roof panel 4 can be detected more accurately.

The limit switch 77 outputs the position detecting signal to the controller 50. For this reason, the limit switch 77 is provided with two switch-side connecting terminals 90 and 91, and also the control board 51 is provided with two board-side connecting terminals 92 and 93, which are terminal-connected to the switch-side connecting terminals 90 and 91.

Each of the switch-side connecting terminals 90 and 91 is formed like a flat plate by using a conductor, and is provided to project from a main body of the limit switch 77.

Meanwhile, the board-side connecting terminals 92 and 93 are formed of a conductor having predetermined elasticity, and have leg portions 94 and 95 and connecting portions 96 and 97, respectively. The leg portions 94 and 95 are each formed by bending in a crank shape, and the board-side connecting terminals 92 and 93 are fixed by soldering respective base portions 94a and 95a of the leg portions 94 and 95 at the control board 51. The connecting portion 96 is formed integrally with the leg portion 94 at a tip of the leg portion 94, and has a back portion 96a and two pinching portions 96b and 96c formed in parallel to and integrally with the back portion 96a. Similarly, the connecting portion 97 is formed integrally with the leg portion 95 at a tip of the leg portion 95, and has a back portion 97a and two pinching portions 97b and 97c formed in parallel to and integrally with the back portion 97a. The pinching portions 96b and 96c face the pinching portions 97b and 97c, respectively. Portions opposite to the back portions 96a of the pinching portions 96b and 96c and to the back portions 97a of the pinching portions 97b and 97c serve as introducing portions 98 and 99 for male connectors, respectively. The connecting portions 96 and 97 project into the position-detecting-mechanism mounting portion 70, which is located outside the motor cover 25 through a terminal projecting hole 100 serving as a connection through hole formed in the motor cover 25. Thereby, the back portions 96a and 97a face a support wall portion 101 formed integrally with the above-described wall portion 71.

Then, the switch-side connecting terminals 90 and 91 are moved in a connecting direction, i.e., the limit switch 77 is relatively moved with respect to the connecting portions 96 and 97 and the switch-side connecting terminals 90 and 91 are inserted into the connecting portions 96 and 97 from sides of introducing portions 98 and 99 toward the back portions 96a and 97a, respectively. Thereby, the switch-side connecting terminal 90 is sandwiched between the pinching portions 96b and 96c and connected to each other, and also the switch-side connecting terminal 91 is sandwiched between the pinching portions 97b and 97c and connected to each other. As a result, the limit switch 77 is electrically connected to the control board 51 through the terminal projecting hole 100 by the board-side connecting terminals 92 and 93, so that the position detecting signal can be output to the controller 50. Further, the controller 50 can control the electric motor 21 based on the position detecting signal being input from the limit switch 77.

Thus, in the sunroof motor 20 of the present invention, the control board 51 is fixed in the board case 24, and the limit switch 77 is fixed to the outer face of the motor cover 25, and the control board 51 and the limit switch 77 are connected through the terminal projecting hole 100 by the board-side connecting terminals 92 and 93 serving as the connecting members. Therefore, the limit switch 77 can be disposed freely on the outer face of the motor cover 25 and the layout characteristics thereof are increased. Accordingly, the limit switch 77 is fixed in a vicinity of the control board 51, which is fixed near the motor cover 25 inside the motor cover 25 while maintaining a positional relationship with the cam plate 76, and so the sunroof motor 20 can be miniaturized.

Also, in the sunroof motor 20 of the present invention, the switch-side connecting terminals 90 and 91 provided to the limit switch 77 are moved toward the board-side connecting terminals 92 and 93 fixed to the control board 51, whereby these terminals are terminal-connected to each other.

Therefore, the mounting of the limit switch 77 and the control board 51 is facilitated, and ease in assembly of the sunroof motor 20 can be improved.

Further, in the sunroof motor 20 of the present invention, since the limit switch 77 is directly connected to the board-side connecting terminals 92 and 93 fixed to the control board 51, a space required for the arranging and the soldering and the like of the lead wire between the limit switch 77 and the control board 51 becomes unnecessary, and the sunroof motor 20 can be miniaturized.

Further, in the sunroof motor 20 of the present invention, since the leg portions 94 and 95 of the board-side connecting terminals 92 and 93 are each formed like a crank shape, the connecting portions 96 and 97 can be set in arbitrary places irrespective of fixed positions of the base portions 94a and 95a to the control board 51. Therefore, the layout characteristics of the limit switch 77 and the control board 51 can be improved, which results in miniaturization of the sunroof motor 20.

The sunroof motor 20 is assembled mainly by performing the following steps.

First, at the mounting portion 23a, the gear case 23 is fixed to an end of the yoke 21a of the electric motor 21 and the revolution speed sensor 29 is mounted. Then, the output shaft 36 is mounted to the boss portion 35 of the gear housing portion 23b, and the worm wheel 31, the damper rubber 40, and the follower plate 32 are assembled from the side of the opening portion 23c of the gear housing portion 23b in order and are fixed by the C-ring 37. At this time, the brush feeding terminals 53 and 54 of the electric motor 21 pass through a through hole provided in the gear case 23 and are supported by the power-supply-terminal supporting block 57.

Next, the board case 24 is assembled at the gear case 23 from its bottom side. The control board 51 is fixed from the side of the opening portion 23c of the gear case 23 so as to be located in the board case 24. At this time, the two Hall ICs 28a and 28b provided onto the control board 51 are located through an outer wall of the mounting portion 23a so as to face the magnet 27 fixed to the armature shaft 26. Also, the brush feeding terminals 53 and 54 of the electric motor 21 are connected to the power supply terminals 55 and 56 provided to the control board 51.

Then, the gear-case-side fixing portion 60a of the stay 60 is disposed in accordance with the opening portion 23c of the gear housing portion 23b, and the motor cover 25 is mounted such that the gear-case-side fixing portion 60a is sandwiched and the board-side connecting terminals 92 and 93 project from the terminal projecting hole 100, and the opening portions of the gear case 23 and the board case 24 are closed. Then, the board-case-side fixing portion 60c is screwed to the stay mounting portion 24b.

Meanwhile, in the panel-position detecting mechanism 72, the main shaft 73, the external gear 74, the internal gear 75, and the cam plate 76 are unitized and assembled in advance. Then, as shown in FIG. 8, the limit switch 77 is disposed such that the switch-side connecting terminals 90 and 91 face the introducing portions 98 and 99. From this state, the limit switch 77 is moved in a connecting direction, i.e., in a direction away from the output shaft 36 from the side of the output shaft 36, thereby inserting the switch-side connecting terminals 90 and 91 into the connecting portions 96 and 97 of the board-side connecting terminals 92 and 93 for the terminal-connection. By so doing, the limit switch 77 is temporarily fixed to the board-side connecting terminals 92 and 93.

At this time, a pushing force toward the side of the support wall portion 101 is exerted on the connecting portions 96 and 97 due to insertion of the switch-side connecting terminals 90 and 91. However, the pushing force is supported by the support wall portion 101 because the back portions 96a and 97a of the connecting portions 96 and 97 face the support wall portion 101 near the support wall portion 101.

Thus, in the sunroof motor 20 of the present invention, since the pushing force exerted on the board-side connecting terminals 92 and 93 is supported by the support wall portion 101, it is possible to reduce the force exerted on the soldered portions between the respective board-side connecting terminals 92 and 93 and the control board 51 in connecting the switch-side connecting terminals 90 and 91, and to improve reliability of the sunroof motor 20.

Then, the screw member 81 is inserted into a through hole 77b provided to the limit switch 77, and is screwed from a direction parallel to the axial direction of the output shaft 36, thereby fixing the limit switch 77 to the motor cover 25.

By so doing, in the sunroof motor 20 of the present invention, the limit switch 77 is screwed into the motor cover 25, from a direction perpendicular to the directions of connecting the switch-side connecting terminals 90 and 91 and the board-side connecting terminals 92 and 93, so that the limit switch 77 can be certainly screwed without exerting on the board-side connecting terminals 92 and 93 a tightening force caused in screwing. Therefore, in fixing the limit switch 77, especially, a drawback for the board-side connecting terminals 92 and 93 to fall out of the control board 51, and the like can be solved, whereby reliability of the sunroof motor 20 is improved.

Also, the unitized main shaft 73, external gear 74, internal gear 75, and cam plate 76 are mounted, and the position-detecting-portion cover 82 is mounted on each top of them.

The present invention is not limited to the above-mentioned embodiment, and, needless to say, can be variously changed and modified without departing from the gist thereof. For example, in the present embodiment, the output shaft 36 drives the roof panel 4 openably and closably provided in the vehicle 1, but is not limited to this and may drives other members.

Further, in the present embodiment, the switch-side connecting terminals 90 and 91 are each formed in a flat-plate shape, and the board-side connecting terminals 92 and 93 are formed in shapes in which the pinching portions 96b and 96c; 97b and 97c for sandwiching the switch-side connecting terminals 90 and 91 are provided, respectively. However, these terminals are not limited to the above-mentioned shapes, and may be formed in any shapes if they are terminal-connected by relatively moving each other for combining.

Further, in the present embodiment, the actuator case 22 has the gear case 23 and the board case 24 formed separately. However, the gear case 23 and the board case 24 are not limited to such separating forms, and may be formed integrally.

Furthermore, in the sunroof motor 20 of the present embodiment, if the position-detecting-portion cover 82 is mounted on the motor cover 25 without assembling the external gear 74, the internal gear 75, the cam plate 76, the limit switch 77 and the like, then an inexpensive sunroof motor without a position detecting function can be obtained.

According to the present invention, the detecting switch is fixed outside the actuator case, and the control means is fixed inside the actuator case, and the detecting switch and the control means are connected through the connecting through hole by the connecting member. Therefore, the layout characteristics of the detecting switch are increased, and the electric actuator can be miniaturized by fixing the detecting switch in the vicinity of the control means.

Also, according to the present invention, the detecting switch and the control board are connected through the switch-side connecting terminals provided in the detecting switch and through the board-side connecting terminals fixed to the control board. Therefore, the assembling of the detecting switch and the control board is facilitated and ease of assembly of the electric actuator can be improved.

Further, according to the present invention, since the detecting switch is directly connected to the board-side connecting terminals fixed to the control board, it can be disposed in the vicinity of the control board so that the electric actuator can be miniaturized.

Further, according to the present invention, since the leg portions of the board-side connecting terminals are each formed by bending in a crank shape, the connecting portions thereof can be set in arbitrary places irrespective of fixed positions of it to the control board. Therefore, the layout characteristics of the detecting switch and the control board can be increased to miniaturize the electric actuator.

Further, according to the present invention, since the board-side connecting terminals are in the vicinity of and face the support wall portion formed on the actuator case, the force exerted on the board-side connecting terminals from the switch-side connecting terminals is supported by the support wall portion. Therefore, it is possible to reduce the force exerted on the fixed portions of the board-side connecting terminals and the control board in connecting the switch-side connecting terminals, and to improve reliability of the electric actuator.

Further, according to the present invention, the detecting switch is screwed to the actuator case, from the direction perpendicular to the connecting direction of the switch-side connecting terminals and the board-side connecting terminals. Therefore, the detecting switch can be certainly fixed to the actuator case without exerting any force on the board-side connecting terminals, and so reliability of the electric actuator can be improved.

What is claimed is:

1. An electric actuator having an electric motor, an actuator case fixed to said electric motor, and a speed reduction mechanism housed in said actuator case and reducing a speed of rotation of said electric motor to transmit the rotation to an output shaft, the electric actuator comprising:
   a detecting switch fixed outside said actuator case and actuated by a cam member operated in synchronization with said output shaft to output a detecting signal in accordance with a rotational position of said output shaft;
   control means fixed inside said actuator case and having a control board for controlling said electric motor based on said detecting signal from said detecting switch; and
   a connecting member for electrically connecting said detecting switch and said control board through a connecting through hole provided in said actuator case.

2. The electric actuator according to claim 1, wherein said connecting member is a board-side connecting terminal including: a leg portion fixed to said control board; and a connecting portion projecting outside from said connecting through hole to be connected to a switch-side connecting terminal provided to said detecting switch.

3. The electric actuator according to claim 2, wherein said leg portion is formed by bending in a crank shape.

4. The electric actuator according to claim 2, wherein said detecting switch is screwed to said actuator case from a direction perpendicular to a connecting direction of said switch-side connecting terminal and said connecting portion.

5. The electric actuator according to claim 2, wherein a support wall portion facing said board-side connecting terminal is formed integrally with said actuator case on a back side of said connecting portion relative to said connecting direction.

6. The electric actuator according to claim 2, wherein said cam member is disposed coaxially with said output shaft, and said detecting switch is in slidable contact with an outer peripheral face of said cam member.

7. The electric actuator according to claim 6, wherein said switch-side connecting terminal is connected to said connecting portion by moving said detecting switch away from said output shaft, and said detecting switch is screwed from a direction parallel to an axial direction of said output shaft.

8. The electric actuator according to claim 1, wherein said cam member and said detecting switch are covered with a cover engaged with said actuator case.

9. The electric actuator according to claim 1, wherein said output shaft is connected to an opening/closing member openably and closably mounted to a roof of a vehicle, and said opening/closing member is opened and closed by rotation of said output shaft.

10. The electric actuator according to claim 2, wherein said cam member and said detecting switch are covered with a cover engaged with said actuator case.

11. The electric actuator according to claim 2, wherein said output shaft is connected to an opening/closing member openably and closably mounted to a roof of a vehicle, and said opening/closing member is opened and closed by rotation of said output shaft.

12. The electric actuator according to claim 4, wherein a support wall portion facing said board-side connecting terminal is formed integrally with said actuator case on a back side of said connecting portion relative to said connecting direction.

13. The electric actuator according to claim 4, wherein said cam member is disposed coaxially with said output shaft, and said detecting switch is in slidable contact with an outer peripheral face of said cam member.

14. The electric actuator according to claim 4, wherein said cam member and said detecting switch are covered with a cover engaged with said actuator case.

15. The electric actuator according to claim 4, wherein said output shaft is connected to an opening/closing member openably and closably mounted to a roof of a vehicle, and said opening/closing member is opened and closed by rotation of said output shaft.

16. The electric actuator according to claim 5, wherein said cam member is disposed coaxially with said output shaft, and said detecting switch is in slidable contact with an outer peripheral face of said cam member.

17. The electric actuator according to claim 5, wherein said cam member and said detecting switch are covered with a cover engaged with said actuator case.

18. The electric actuator according to claim 5, wherein said output shaft is connected to an opening/closing member openably and closably mounted to a roof of a vehicle, and said opening/closing member is opened and closed by rotation of said output shaft.

19. The electric actuator according to claim 6, wherein said cam member and said detecting switch are covered with a cover engaged with said actuator case.

20. The electric actuator according to claim 6, wherein said output shaft is connected to an opening/closing member openably and closably mounted to a roof of a vehicle, and said opening/closing member is opened and closed by rotation of said output shaft.

* * * * *